May 18, 1965 J. D. BIDLACK 3,183,785
ADAPTIVE GAIN SERVO ACTUATOR
Filed June 26, 1963 3 Sheets-Sheet 1

INVENTOR.
JERALD D. BIDLACK
BY
Bower & Patalidis
ATTORNEYS

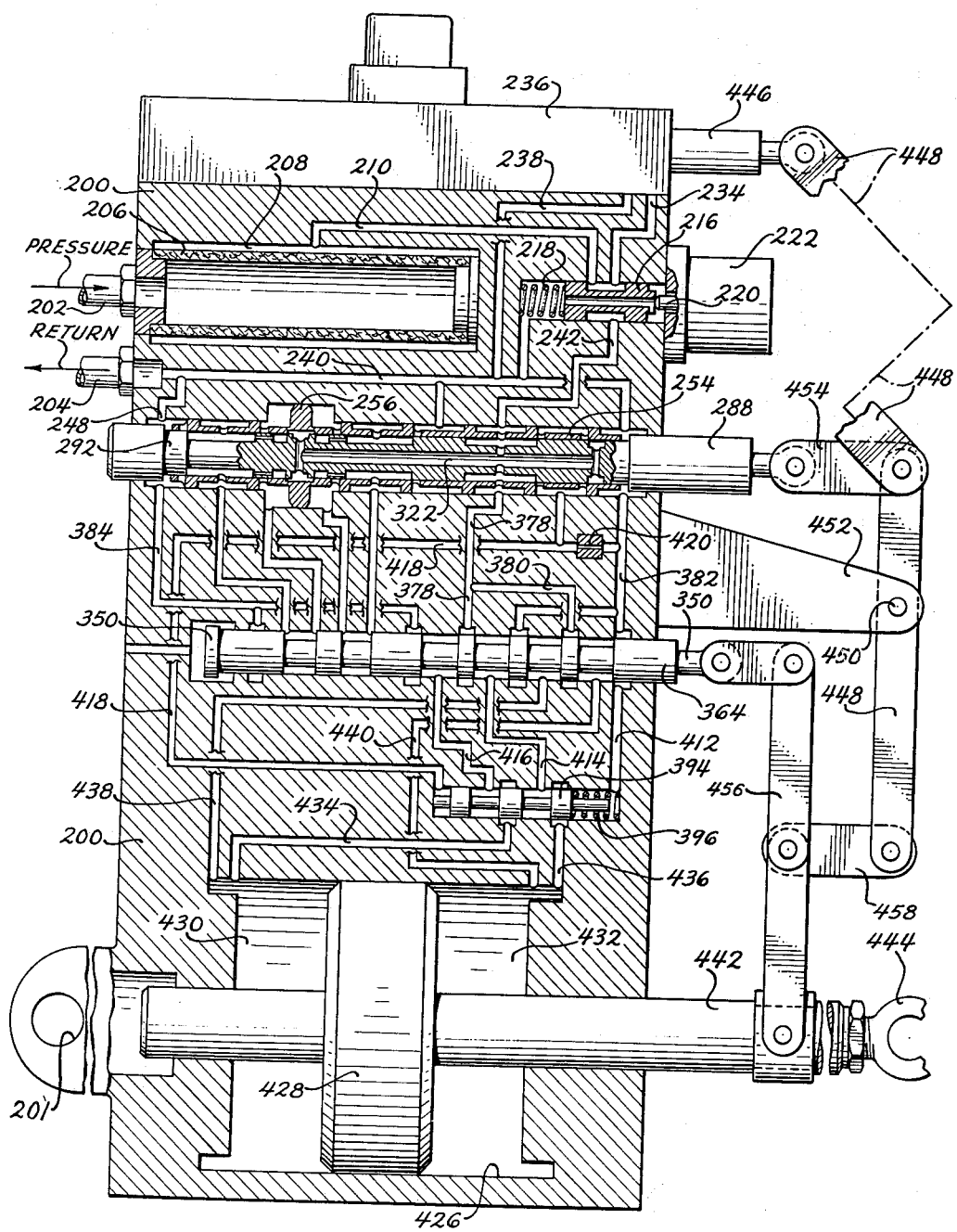

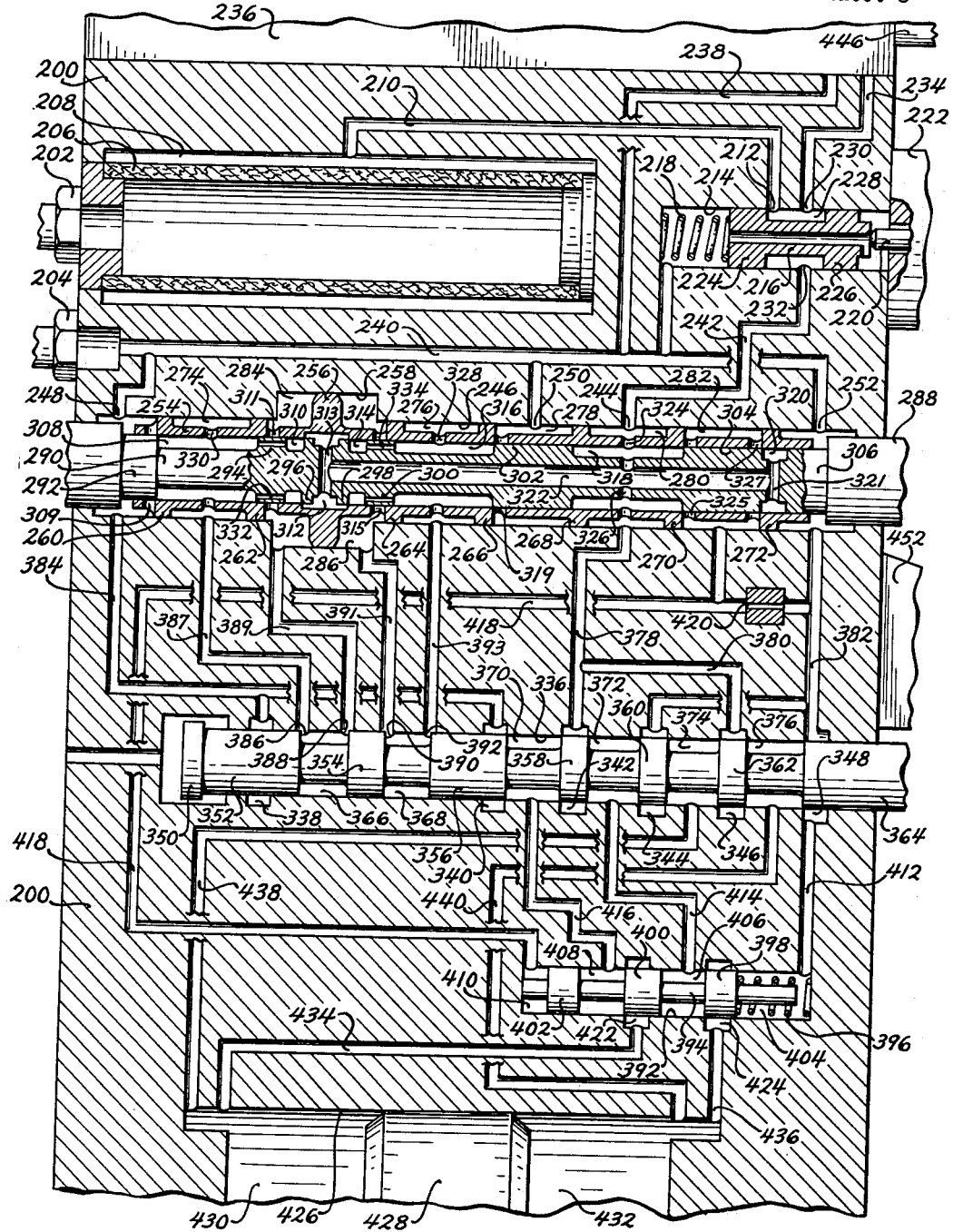

United States Patent Office 3,183,785
Patented May 18, 1965

3,183,785
ADAPTIVE GAIN SERVO ACTUATOR
Jerald D. Bidlack, Fraser, Mich., assignor to
Cadillac Gage Company, Warren, Mich.
Filed June 26, 1963, Ser. No. 290,806
17 Claims. (Cl. 91—20)

This invention relates to improvement in power servo actuators, and more particularly relates to servo mechanisms for linearly positioning an output member by fluid means in response to input signals and providing amplitude and power amplifications between the input portion of the system and the output portion.

In the art of data processing, digital and analog computers, machine tools, automation, aircraft and spacecraft control systems, underwater craft control systems, etc., there exists a need for devices which accurately position a shaft or a movable reference output element in response to control signals applied to the input of the device.

However, servo mechanisms with requirements for high response characteristics, high inertia loads at the output, and the utilization of incompressible as well as compressible fluids under adverse conditions of wide temperature and ambient pressure range, often result in unstable systems when using prior art servo system concepts. The present invention provides an adaptive gain power servo actuator which, in spite of its substantially small size and reduced weight, satisfies all requirements of stability and repeatability under the most adverse conditions.

The fluids capable of being used as the motive power in a servo system according to the invention may be liquid fluids or compressed gases, either cold or hot, and the response characteristics of the system remain exceptionally good irrespective of whether an uncompressible or a compressible fluid is utilized.

The adaptive gain servo actuator of the present invention comprises an input positioner, which may be of a binary or analogue type, controlling a servo power booster whose output member is precisely positioned to a position analogous to the position of the input positioner output member and which is capable of moving a high inertia load. The intermediate control portion of the system between the input positioner and the servo power actuator comprises a low gain stage operating when small amplitude displacements are required and a highly dampened high gain stage operative when substantially large amplitude displacements are required. The actions of the low gain and high gain stages are adaptive, that is, they are, at all times, correctly proportioned and automatically balanced in order to provide an optimum response rate of the system under all conditions, with great stability, no hunting, no drift and accurate repeatability. A mechanical feedback is provided between the power booster output actuator member and the intermediate control portion of the system to provide positioning accuracy and adequate dampening.

It is, therefore, an object of this invention to provide a powerful servo actuator which is capable of moving a load to a plurality of positions analogous to the positions of an input member, with positive stopping at each position.

It is an additional object of this invention to provide a servo actuator developing a great power with practically no lag in operation, almost instantaneous response and not subject to drift once the output member has been positioned.

It is a further object of this invention to provide a servo actuator which has positive dampening of the acceleration and deceleration of the movable output member, and which positions the output member to the ordered position rapidly, positively and without oscillatory hunting.

It is another object of this invention to provide a servo actuator affording power and amplitude amplifications between the input and output portions of the system.

It is an important object of this invention to provide a servo actuator capable of a constantly variable gain between the input and the output, the gain being substantially proportional to the amplitude of the motion which the output member is ordered to effectuate.

It is another object of the invention to provide a servo actuator capable of using compressible as well as uncompressible fluids as a motive power, under wide ranges of ambient temperature and pressure.

Additional objects and advantages of the invention will become apparent from the following description and appended claims taken in connection with the accompanying drawings which disclose by way of examples, the principle of the invention and some of the best modes which have been contemplated of applying that principle.

FIGURE 2 is a schematic cross-sectional view of another embodiment of the invention; and FIGURE 3 is an enlarged view of a portion of the device illustrated in FIGURE 2.

Figure 1:
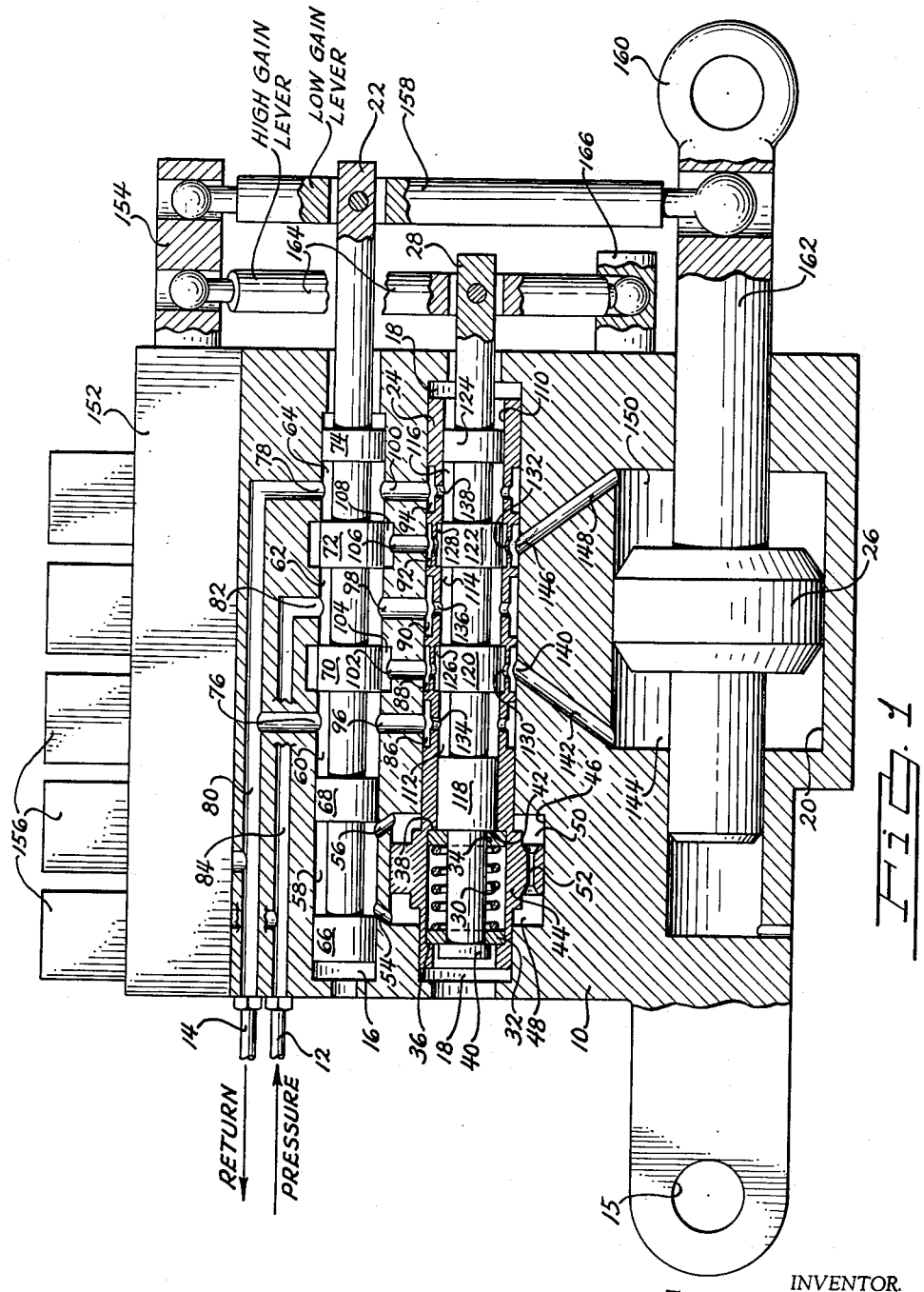
FIGURE 1 is a schematic sectional view of an adaptive gain servo actuator embodying the principle of the present invention.

Referring now to the drawings, and more particularly to FIGURE 1 thereof, a variable or adaptive gain servo actuator according to the principle of the invention is shown as comprising a housing 10 connected, by way of a fluid pressure inlet conduit 12 to a pressure fluid supply, not shown, the spent fluid being returned to the fluid supply by means of a fluid return outlet conduit 14. The housing is mounted upon a support, not shown, by any conventional means such as the pivotal mounting element 15 and is provided with bores 16, 18 and 20, wherein are slidably disposed, respectively, a low gain valve spool 22, a high gain valve sleeve 24 and a servo power booster piston member 26. A high gain valve spool 28 is further slidably disposed within the high gain valve sleeve 24 in the manner and for the purpose hereinafter explained in more details.

A yieldable connection is provided between the high gain valve spool 28 and sleeve 24 by means of a coil spring 30 compressed between washers 32 and 34 abutting respectively against the shoulder portions 36 and 38 of the sleeve 24, and against the shoulder flange 40 and the shoulder 42 on the valve spool 28. The high gain valve sleeve 24 has a piston-like enlarged portion 44 disposed in a correspondingly enlarged diameter portion 46 of the bore 18 which is thus divided into annular chambers 48 and 50. The annular chambers 48 and 50 are placed in fluid communication by way of a calibrated transfer passageway 52 through the piston-like enlarged portion 44 of the sleeve. Chamber 48, by means of a port 44, the chamber 50, by means of a port 56, are further placed in fluid communication with an annular chamber 58 situated in the low gain bore 16.

The low grain bore 16 is divided in annular chambers 60, 62 and 64 by lands 66, 68, 70, 72 and 74 of the low gain valve spool 22. The bore 16, besides ports 54 and 56 previously mentioned, is also provided with ports 76 and 78 placing at all time annular chambers 60 and 64, respectively, in fluid communication with return fluid outlet 14 by means of conduit 80. Bore 16 is also provided with a port 82 situated in annular chamber 62 and placing the latter in fluid communication with fluid pressure inlet 12 by means of conduit 84.

The high gain valve sleeve 24 has its outer diameter provided with five undercut portions defining five annular chambers 86, 88, 90, 92 and 94 in the bore 18. Annular chamber 86 is at all time in fluid communication with annular chamber 60 in bore 16 by means of passageway 96, annular chamber 90 is at all time in fluid communication with annular chamber 62 in bore 16 by way of passageway 98 and annular chamber 94 is at all time in fluid communication with annular chamber 64 in bore 16 by way of passageway 100. Annular chamber 88 communicates, by way of passageway 102, with an annular recess 104 disposed in bore 16 and normally obturated by land 70 of the low gain valve spool 22. Annular chamber 92 is similarly at all time in communication by way of passageway 106 with annular recess 108, also disposed in bore 16 and normally obturated by land 72 of the low gain valve spool 22.

The high gain valve sleeve 24 has an inner bore 110 which is divided in annular chambers 112, 114 and 116 by lands 118, 120, 122 and 124 of the high gain valve spool 28. The inner bore 110 of the high gain valve sleeve 24 is further provided with two annular recesses 126 and 128 surrounding lands 120 and 122, respectively, of the high gain valve spool 28 and being at all time in fluid communication with annular chambers 88 and 92, respectively, by means of ports 130 and 132. Annular chambers 112, 114 and 116 are also at all time in fluid communication with annular chambers 86, 90 and 94, respectively, by means of ports 134, 136 and 138. The annular chamber 88, by means of port 140 and passageway 142, is in fluid communication with servo booster chamber 144 in the servo power booster cylinder 20. In a similar manner, the annular chamber 92 communicates, by way of port 146 and passageway 148 with servo power booster chamber 150, chambers 144 and 150 being disposed on each side of the servo power booster piston member 26.

An input positioner 152 is mounted on the housing 10 and comprises a positionable output member 154, displaceable according to electrical input signals fed to solenoid valves 156. The input positioner may be an analogue positioner or a binary actuator and positioner similar to the apparatus described in United States application Serial No. 98,549, filed March 27, 1961, in the name of Jack M. Brandstadter and assigned to the same assignee as the present invention and which has now matured as Patent No. 3,141,388, or to the positioner comprised in the disclosure of copending application Serial No. 153,076, filed November 17, 1961. The positioner output member 154 controls, by means of a low gain lever 158, the position of the low gain valve spool 22 away from the closed position shown in the drawing. The other end of the low gain lever 158 is pivotally mounted on the servo power booster output member 160 integral with a rod 162 which is in turn integral with, or fastened to, the servo power booster piston member 126.

The positioner output member 154 is also capable of controlling the high gain valve spool 28, by means of a high gain lever 164 having its other end pivotally mounted on a fulcrum support 166 integral with, or fastened to, the housing 10.

In this manner, any displacement of the positioner output member 154 results in a corresponding displacement of both the low gain valve spool 22 and high gain valve spool 28, and any displacement of the servo power booster output member 160 is mechanically fed back to the low gain valve spool by means of the low gain lever 158.

When a signal is fed to the positioner 152, the result is a displacement of the positioner output member 154 and the low gain lever 158 causes the low gain valve spool 22 to be displaced of a corresponding amount. At the same time, the high gain valve spool 28 is also displaced, and the actions of the low gain and high gain valves are constantly combined to achieve a response which is automatically adjusted to the requirement of the system and which results in a correct positioning of the servo booster output member without undue delay and without lack of stability that could give rise to undesirable hunting.

If, for example, the positioner output member 154 is displaced toward the right, as shown in FIGURE 1, the low gain valve spool member 22 is also displaced to the right, thereby placing the annular chamber 62 in fluid communication with the annular recess 108 now no longer obturated by land 72, and the annular chamber 60 is simultaneously placed in fluid communication with the annular recess 104 as a result of the displacement, also the right, of land 70. Pressure fluid present in the annular chamber 62 is consequently directed by passageway 106 to the annular chamber 92 in the high gain valve bore 18, and from there to the servo power booster chamber 150 by way of passageway 148. At the same time fluid present in the servo power booster chamber 144 is urged to flow into the annular chamber 88, via passageway 142, and from the annular chamber 88 to the annular recess 104, in the low gain valve bore 16, and from there to the annular chamber 60 and to return outlet 14 via conduit 80. The servo power booster piston member 26 is therefore solicited toward the left, as seen in the drawing, and the low gain lever 158 moves the low gain valve spool 22 back to the position shown in the drawing, interrupting any further flow of fluid into servo booster chamber 150 and from servo booster chamber 144 and thereby stopping displacement of the power booster output member 160.

At the same time as the positioner output member 154 had displaced the low gain valve spool 22 to the right by way of the low gain lever 58, the high gain valve spool 28 was also displaced to the right by the action of the high gain lever 164. The displacement of the high gain valve spool 28 tends to cause a corresponding displacement of the high gain valve sleeve 24 because of the resilient mechanical interconnection between the spool and the sleeve through the coil spring 30. The enlarged piston-like portion 44 of the valve sleeve 24 is consequently also displaced to the right pushing against the fluid present in chamber 50. If the amount of displacement of low gain valve spool 22 is small, the fluid present in chamber 50 is exhausted by way of port 56 into annular chamber 58 and returned to chamber 48 by way of port 54. If the amount of displacement of low gain valve spool 22 is sufficiently important to cause its land 66 to obturate port 54, the fluid present in chamber 50 is forced into chamber 48 through the calibrated transfer passageway 52. The calibrated transfer passageway 52 offering to the passage of the fluid from chamber 50 to chamber 48 a sectional area purposely much smaller than the sectional area of ports 56 and 54, the resulting interference with the displacement of the enlarged portion 44 of the high gain valve sleeve 24 causes the sleeve to lag in its displacement as compared to the displacement of the high gain valve spool 28. The high gain valve sleeve 24 is displaced to the left in relation to the high gain valve spool 28. Consequently land 122 of the high gain valve spool 28 does not obturate any longer the annular recess 128, and pressure fluid present in the annular chamber 114, communicating with annular chamber 62 through port 136, annular chamber 90 and passageway 98, is introduced into annular recess 128 and annular chamber 92, via port 132, thereby increasing the flow of pressure fluid into the servo power booster chamber 150. As soon as the high gain valve sleeve 24 has caught up with the displacement of the high gain valve spool 28, this action being due to the fluid transferring from annular chamber 50 to annular chamber 48 through calibrated passageway 52, land 122 again obturates the annular recess 128 and the increased pressure fluid flow into the servo power booster chamber 150 comes to an end, the only fluid flow into the chamber 150 being the fluid metered by the low gain valve spool as precedently explained.

Conversely, when the displacement of the high gain valve sleeve 24 is caused to lag behind the displacement of the high gain valve spool 28, the egress of fluid from the servo booster chamber 144, in the example of operation heretofore described, is also proportionally increased due to the annular recess 126 being opened to the annular chamber 112 in communication with return outlet 14 by way of port 134, annular chamber 86, passageway 96, annular chamber 60 and passageway 80.

In this manner, the high gain valve sleeve 24 is caused to lag more or less behind the displacement of the high gain valve spool 28 according to whether lands 66 or 68 of the low gain valve spool 22 obturate more or less ports 54 or 56 respectively. In other words, the action of the high gain valve is proportional to the amplitude of displacement of the low gain valve spool, which in turn is proportional to the amplitude of displacement of the positioner output member 154. For small displacement of the low gain valve spool, the high gain valve does not operate, and for high displacement of the low gain valve spool, the high gain valve does operate. For any intermediate displacement resulting in partial occlusion of port 54 or port 56, there is, at all time, an appropriate balance of control through the high gain and low gain portions of the system, resulting in a correct response at the servo power booster output, the response being faster for large amplitude motions than for small amplitude motions. Furthermore, the area of the calibrated transfer passageway 52 determines the rate of fluid flow from annular chamber 50 to annular chamber 48, thereby causing a precisely determined time delay period beyond which the high gain portion of the system is progressively cut off.

If the positioner output member 154 is displaced to the left, as seen in the drawing, the low gain valve spool 22 and the high gain valve spool 28 are also displaced to the left, and the precedently described succession of events takes place in an opposite direction resulting in the servo power booster output member 160 being displaced to a finite position to the right of the position shown in the drawing.

It is apparent from the description of the device and of its operation that the absolute positions of the high gain sleeve 24 and spool 28 have no influence upon the operation of the servo actuator, and that it is only the relative position between those elements which determines whether the low gain portion or stage, alone, of the system should operate, or whether a combination of the low gain and high gain stages should operate together, the effect of the high gain stage being added to the effect of the low gain stage proportionally to the amount of relative displacement between the sleeve and the spool, and the effect of the high gain stage being progressively cut off after a time delay period.

Referring now to FIGURE 2 and more particularly to FIGURE 3, a housing 200, mounted on a support, not shown, by any conventional means, such as, for example, the pivotal link 201, is provided with a fluid pressure inlet 202 and fluid return outlet 204, both connected to a fluid supply, not shown. The fluid pressure inlet 202, in the example of the embodiment of the invention as shown, leads into a filter element 206 placed in an appropriate cavity 208 disposed in the housing 200. Fluid under pressure passing through the filter element 206 is directed by means of a passageway or conduit 210 to a port 212 in a shut-off valve bore 214. A shut-off valve spool 216 is slidably disposed within the bore 214 and is urged toward the right, as seen in the drawings, by a coil spring 218 placed beyond one end thereof. The other end of the shut-off valve spool 216 is in contact with the plunger 220 of a shut-off solenoid 222. The valve spool 216 is provided with two land portions 224 and 226 defining therebetween an annular chamber 228. A first port 230 and a second port 232 are continuously open to the annular chamber 228. Land 224 is disposed in such a way as to obturate port 212 when the action of spring 218 displaces the valve spool toward the right. When solenoid 222 is energized, the valve spool 216 is displaced to the left, to the position shown in the drawings, and fluid under pressure is supplied from port 212 to ports 230 and 232.

First port 230 is connected to a passageway 234 which supplies fluid under pressure to an input positioner 236 mounted on the housing 200, and exhausted fluid is returned from the input positioner to the fluid return output 204 by way of passageways 238 and return manifold 240.

Second port 232 is connected by way of passageway 242 to a pressure port 244 into a first bore 246. First bore 246 is also provided with return ports 248, 250 and 252 connected to return manifold 240.

A sleeve 254 is slidably disposed within the bore 246 and is provided with a piston-like enlarged portion 256 disposed in an enlarged cylindrical portion 258 of the bore 246. The sleeve 254 is further provided with lands 260, 262, 264, 266, 268, 270 and 272, defining respectively annular chamber 274, 276, 278, 280 and 282, and the piston-like enlarged portion 256 is normally disposed within the enlarged portion 258 of the bore 246 in such a way as to define therein two annular chambers 284 and 286. A plurality of ports such as 309, 311, 315, 319, 325 and 327 are drilled through the wall of the sleeve 254, and a series of similarly disposed orifices 330, 328 and 324 are also placing in communication the interior bore of the sleeve with its outer surface for the purposes hereinafter explained.

A spool 288 is in turn slidably disposed within the sleeve 254. The spool 288 has an undercut body portion 290 provided with lands 292, 294, 296, 298, 300, 302, 304 and 306 defining, respectively, annular chambers 308, 310, 312, 314, 316, 318 and 320. Land 292 normally occludes port 309 in sleeve 254, and lands 294, 300 and 302 normally occlude ports 311, 315 and 319, respectively, port 311 and 315 being normally situated substantially at equal distances from the two ends of lands 294 and 300, respectively. Land 304 occludes ports 325 and 327, and any relative displacement between the valve sleeve and the valve spool results in annular chamber 282 being placed in communication with annular chamber 318 or annular chamber 320, according to the direction of the relative displacement.

A passageway 322 is longitudinally disposed through the body portion 290 of the spool 288 and normally supplies fluid under pressure, flowing from annular chamber 280, to annular chamber 318 by way of orifices 324 through the wall of the sleeve 254 and by way of orifices 326 through the spool body portion 290. By means of passageway 322, fluid under pressure is supplied at all times to annular chambers 312 and 320 through cross-channels 313 and 321, respectively. Orifices 328 place annular chamber 276 in communication with annular chamber 316, orifices 330 place annular chamber 274 in communication with annular chamber 308 and transfer channels 332 through land 298 place annular chamber 308 in communication with annular chamber 310. Transfer channels 334, similarly disposed through land 300, place annular chamber 316 in communication with annular chamber 314.

A second bore 336 is also disposed within the housing 200 and is provided with enlarged annular recesses 338, 340, 342, 344, 346 and 348. A control valve spool 350 is slidably disposed within the bore 336, and the control valve spool is provided with land portions 352, 354, 356, 358, 360, 362 and 364 defining, respectively, annular chambers 366, 368, 370, 372, 374 and 376. Land 356 is further adapted to normally obturate annular recess 340, and lands 358, 360, 362 and 364 are adapted to normally obturate annular recesses 342, 344, 346 and 348, respectively. Annular recesses 342 and 346 are normally supplied by fluid under pressure from annular chamber 280, in bore 246, by means of conduits 378 and 380, and annular recess 344 is normally connected to return manifold 240 by means of conduit 382. Annular recesses 338 and 340 are also normally connected to return manifold 240 by means of conduit 384. Ports 386 and 388, connected respectively to annular chambers 274 and 284 in bore 246 by means of conduits 387 and 389, lead into annular chamber 366, and are adapted to be progressively closed by lands 352 and 354 respectively, according to the direction of displacement of the valve spool 350. Similarly, ports 390 and 392, respectively connected to annular chambers 286 and 276 in bore 246 by means of conduits 391 and 393, lead into annular chamber 368 and are adapted to be progressively closed by lands 354 and 356, according to the direction of displacement of the valve spool 350.

A third smaller bore 392 is also disposed in the housing 200 and intermediate valve spool 394 is freely disposed therein, being normally urged toward the left, as seen in the drawings, by a coil spring 396 disposed between one end of the bore 392 and a land portion 398 of the valve spool 394. Besides land 398, the spool 394 is also provided with lands 400 and 402 which define, within the bore 392, annular chambers 404, 406, 408 and 410, respectively. Annular chamber 404 is connected to fluid return by way of passageway 412, annular chamber 406 is connected to annular chamber 372 in bore 336 by means of passageway 414, annular chamber 408 is connected to annular chamber 370, also in bore 366, by means of a passageway 416 and annular chamber 410 is connected to annular chamber 282 in bore 246 by means of conduit 418. Conduit 418 is also connected to return passageway 382 through calibrated orifice 420, for the purpose hereinafter explained. Intermediate valve bore 392 is further provided with undercut annular recesses 422 and 424 which are normally obturated by lands 400 and 398, respectively, of the intermediate valve spool 394.

A further bore 426, which constitutes the cylinder portion of a servo power booster actuator, is also situated within the housing 200 and a piston member 428 disposed within the servo power booster actuator bore 426 separates it into two motor chambers 430 and 432 on both sides of the piston member. Annular recess 422 of the intermediate valve is connected to motor chamber 430 by means of passageway 434 and annular recess 424 is connected to motor chamber 432 by means of passageway 436. Motor chamber 430 is also placed in communication with annular chamber 374 in bore 336 by passageway 438 and motor chamber 432 is, similarly, placed in communication with annular chamber 376, also in bore 366, by means of passageway 440. A rod member 442, FIGURE 2, affixed to the servo power booster actuator piston 428, is capable of displacing an output member 444.

The input positioner 236, which may be similar to the input positioner of FIGURE 1, is provided with an output member 446 which actuates a first lever 448 pivoting around a fulcrum 450 on a brace member 452 mounted on the housing 200. The lever 448 is operatively connected to the valve spool 288 by means of a link 454. The free end of the lever 448 is pivotally connected to the fulcrum of a second lever 456 by means of a link 458, and one end of the second lever 456 is connected to the control valve spool 350 while the other end of the second lever is pivotally connected to the servo power booster actuator output rod 442. By means of this linkage arrangement, any displacement of the input positioner output member 446 results in a displacement of both valve spools 288 and 350, and any motion of the actuator output member 444 is mechanically fed back to the control valve spool 350.

The apparatus of FIGURES 2 and 3 operates in the following manner:

Any displacement of the positioner output member 446 results in a corresponding displacement in the same direction of the valve spool 288, and in a displacement in an opposite direction of the end of lever 448 connected to link 458. This, in turn, causes lever 456 to pivot around its end attached to the servo power booster output rod 442, displacing the control valve spool 350 in a direction opposite to the direction of motion of both the positioner output member 446 and the valve spool 288.

If, for example, the positioner output member 446 is displaced to the right, as seen in the drawings, of a small distance, control valve spool 350 is displaced to the left also of a small distance. Annular recess 346, which is at all times connected to pressure fluid through conduits 380 and 378, is no longer obturated by land 362 and is now connected to annular chamber 376. Fluid under pressure is consequently introduced into the power booster actuator motor chamber 432 via passageway 440. At the same time, fluid is exhausted from the power booster actuator motor chamber 330 via passageway 438, annular chamber 374, annular recess 344 and passageway 382. Consequently the power booster actuator piston member is displaced to the left, output rod 442 and output member 444 are also displaced to the left and lever 456 brings control valve spool 350 back to the neutral position of FIGURES 2 and 3, halting further displacement of the power booster actuator output member.

Contemporaneously, the same displacement of the positioner output member 446 to the right also displaces the valve spool 288 to the right. The annular chamber 312 opens to the annular recess 310, and fluid under pressure flows through transfer channels 332 into annular chamber 308, annular chamber 274, and into conduit 387 to port 386 and annular chamber 366 in bore 336. The fluid is admitted through port 388 into conduit 380 and into annular chamber 284 in the enlarged portion 258 of bore 246. Fluid pressure exerted on the left face of the piston-like enlarged portion 356 of the sleeve 254 causes the sleeve to follow the motion of the spool 288, because the fluid present in annular chamber 286 is simultaneously exhausted into annular chamber 368 in the control valve bore 336, via conduit 391 and port 390, and from annular chamber 268 to annular chamber 276, via port 392 and conduit 393. From the annular chamber 276 the fluid is exhausted to the annular recess 316 and the annular chamber 278 through port 319, and to return outlet 204 through port 250 and return manifold 240.

A large displacement of the positioner output member 446 results in a proportionally large displacement of the control valve spool 350. Assuming again a displacement of the valve spool 350 to the left, as seen in the drawing, a large displacement of the spool causes port 388 to be closed by land 354 and port 392 to be closed by land 356. The sleeve 254 is consequently caused to lag behind the displacement of the spool 288 because no fluid is introduced into the annular chamber 284 and no fluid is exhausted from annular chamber 286. Fluid under pressure in annular chamber 320 is caused to flow into annular chamber 282 through port 327 no longer obturated by land 304, and from annular chamber 282 into passageway 418. Pressure fluid is applied to annular chamber 410 in the intermediate valve bore 392 by passageway 418 leading thereinto, thus displacing the intermediate valve spool 394 to the right against the pressure of the spring 396. Annular recess 424 is consequently opened to annular chamber 406 and fluid under pressure is allowed to flow from annular chamber 372, in control valve spool bore 336, via passageway 414 into annular chamber 406, annular recess 424 and into the power booster actuator motor chamber 432 via passageway 436. At the same time the power booster actuator motor chamber 430 is connected to return by passageway 434 leading into annular recess 422 now open to annular chamber 408 connected to the annular chamber 370 of control valve bore 336 by passageway 416. This additional flow of fluid pressure into the power booster actuator motor chamber 432 and the additional outlet of fluid from the actuator motor chamber 430 cause the power booster actuator piston member 428 to be displaced more rapidly to the left.

In the meanwhile, pressure fluid leaking from conduit 418 to return conduit 382 through calibrated orifice 529 results in a progressive decrease of pressure in annular chamber 410, and after a predetermined time delay depending on the size of calibrated orifice 420, the intermediate valve spool 394 is progressively returned to its closed position, under the action of spring 396, thereby progressively throttling the additional fluid flow to and from the power booster actuator motor chambers and finally entirely cutting off the additional fluid flow. When the amount of error between the position of the positioner output member 446 and the actuator output member 444 is reduced close to zero, that is, when the control valve spool 350 is brought back to a position close to neutral, ports 386 and 388 are again opened to annular chamber 366 at the same time that port 390 and 392 are reopened to annular chamber 368. Sleeve 254 is consequently caused to catch up with spool 288, and the action of the high gain portion of the system is thereby discontinued.

It is evident that if the input positioner output member 446 is displaced to the left, as seen in the drawings, the succession of events described above will also take place, but in an opposite direction, as will be obvious to those skilled in the art, and another description of the operation at the invention under those conditions is obviously superfluous and would only be repetitive.

The amount of maximum lag of the sleeve 254 behind the displacement of the spool 288 is limited by ports 311 or 315 opening to annular recesses 310 or 314 respectively, causing the fluid under pressure present in annular recess 308 or 316, as the case may be, to be connected to chambers 284 or 286.

In actual operation, the system operates under an adaptive gain principle. The effect of the low gain and high gain portions of the system are, at all time, proportionally balanced, according to the amount of error between the positions of the positioner output member and the power booster actuator output member, in order to make the device automatically capable of giving a proper response in function of the input signals to the input positioner.

It is also apparent that, in this embodiment also, the low gain stage of the device is operative for any amount of motion at the input positioner output and that the action of the high gain stage is additive thereto for any amplitude of motion beyond a predetermined threshold, the supplementary action of the high gain stage being determined by the amount of relative displacement between the sleeve 254 and the spool 288. The maximum relative displacement between the sleeve and the spool is also predetermined by design and a time delay is incorporated in the system to progressively cut off the action of the high gain stage after a predetermined period of time.

It is evident that, in both examples of the invention herein described, power amplification is provided between the force that the input positioner output member is capable of developing and the force developed by the power booster actuator output member. The amplitude amplification gain is determined by the relative arm lengths of the mechanical linking levers between the diverse control elements, and that gain may be particularized by proper design for the application requirements of the system.

In the course of the description of the examples of the invention, illustrated in FIGURE 1 and FIGURES 2–3, no mention was made of the many seals, O rings and other leakage preventing elements usually incorporated in devices such as the invention to prevent fluid leakages to the ambient or leakages from a high pressure portion of the apparatus to a low pressure portion, as it is obvious that such leakage preventing elements are well known in the art and form no part of the principle of the present invention.

From the preceding description of the invention, it can be seen that the invention provides a servo power actuator having an output member repeating the positions of an input positioner output member, with amplitude and power amplifications between the input and the output. The response characteristics of the device are automatically tailored to the amplitude of the motions of the input positioner. The invention also provides for smooth, although rigid acceleration and deceleration of the output member and adequate dampening of the servo power actuator, through mechanical feedback resulting in precise and repetitive positions without deleterious oscillatory hunting or drift after positioning.

It is obvious that, for some special applications, the actions of several input positioners could be integrated for control of the servo power actuator, or the action of one or more input positioners could be combined with and modified by a manual input before it is applied to the control portion of the system.

The above examples, together with the preceding description of two structural embodiments incorporating the principle of the invention, are given only for illustration purpose of a few of the possible combinations contemplated, and it will be apparent to those skilled in the art that there will be a great number of such possible combinations.

It is contemplated that various changes, additions and omissions of elements may be made in detail within the scope and spirit of the invention, as expressed in the appended claims.

What is claimed as new is:

1. A fluid operated power servo actuator providing amplitude and power amplifications between an input linear positioner and an output servo power booster comprising in combination:

said linear positioner having an output member positionable to any one of a plurality of positions in response to command signals;

said servo power booster having a fluid operated output member capable of linear motion;

servo valve means adapted to control fluid flow for causing the direction and amount of displacement of the servo power booster output member to be dependent from the direction and amplitude of displacement of the linear positioner output member;

first linkage means operated from the linear positioner output member for mechanically operating the servo valve means;

supplementary additive means responsive to the amplitude of displacement of the linear positioner output member for continuously metering added fluid flow to and from the servo power booster in order to increase the response velocity of said booster proportionally to the amplitude of displacement of the linear positioner output member, said supplementary additive means including limiting means for rendering said supplementary means inoperative below a first predetermined amplitude of displacement of the linear positioner output member, fully operative above a second predetermined amplitude and progressively operative in function of the amplitude for displacements comprised between said first and second predetermined amplitudes;

second linkage means operated from the linear positioner output member for mechanically operating the complementary means;

mechanical feedback means from the power booster output member for controlling the servo valve means to cause said servo valve means to close and stop further displacement of said output member as soon as said output member has reached a position analogous to the position of the linear positioner output member;

time delay means progressively cutting off the action of the limiting means after a predetermined time has elapsed.

2. A fluid operated power servo actuator providing amplitude and power amplifications between an input linear positioner and an output servo power booster comprising in combination:
  said linear positioner having an output member positionable to any one of a plurality of positions in response to command signals;
  said servo power booster having a fluid operated output member capable of linear motion;
  servo valve means adapted to control fluid flow for causing the direction and amount of displacement of the servo power booster output member to be dependent from the direction and amplitude of displacement of the linear positioner output member;
  linkage means operated from the linear positioner output member for mechanically operating the servo valve means;
  error detecting means for determining the amount of error between the position of the power booster output member and the position of the linear positioner output member;
  compensating adaptive means under the control of the error detecting means for modifying the response velocity of the servo power booster in function of the amount of error by increased fluid flow to and from said booster; and
  mechanical feedback means from the servo power booster output member for controlling the servo valve means to cause said servo valve means to close and stop further displacement of said output member as soon as said output member has reached a position analogous to the position of the linear positioner output member.

3. The power servo actuator of claim 2 wherein the compensating adaptive means operates only above a predetermined first amount of error, becomes fully operative only above a predetermined second amount of error and is proportionally partly operative between said first and second amounts of error.

4. The power servo actuator of claim 3 further comprising a time delay rendering the compensating adaptive means gradually inoperative after a predetermined time has elapsed.

5. A servo actuator and power booster apparatus comprising in combination:
  a linear positioner having an output member positionable to any one of a plurality of positions;
  a power booster having an output member capable of linear motion;
  servo valve means under the control of the linear positioner output member, said servo valve means being adapted to control the direction and amount of displacement of the power booster output member in function of the direction and amount of displacement of the linear positioner output member;
  error detecting means for determining the amount of error between the position of the power booster output member and the position of the linear positioner output member;
  compensating adaptive means under the control of both the positioner output member and the error detecting means for modifying the response gain of the power booster in function of the amount of error; and
  mechanical feedback means from the power booster output member for controlling the servo valve means to cause said servo valve means to stop the displacement of said output member as soon as said output member has reached a position analogous to the position of the linear positioner output member.

6. The apparatus of claim 5 wherein the compensating adaptive means is inoperative below a predetermined amount of error and fully operative above another predetermined amount of error.

7. The apparatus of claim 6 further comprising time delay means for rendering the compensating adaptive means inoperative after a predetermined time.

8. A servo actuator comprising in combination:
  a positioner having an output member positionable to any one of a plurality of positions;
  a power booster having a movable output member;
  servo valve means under the control of the positioner output member, said servo valve means being adapted to control the direction and amount of displacement of the power booster output member in function of the direction and amount of displacement of the positioner output member;
  error detecting means for determining the amount of error between the position of the power booster output member and the position of the positioner output member;
  compensating adaptive means under the control of both the positioner output member and the error detecting means for modifying the response velocity of the power booster in function of the amount of error; and
  feedback means from the power booster output member for controlling the servo valve means to cause said servo valve means to stop the displacement of said output member as soon as said output member has reached a position analogous to the position of the positioner output member.

9. The servo actuator of claim 8 wherein the compensating adaptive means is inoperative below a predetermined amount of error and fully operative above another predetermined amount of error.

10. The servo actuator of claim 9 further comprising time delay means for rendering the compensating adaptive means inoperative after a predetermined time.

11. A servo actuator comprising in combination:
  linear positioning means having an output member positionable to any one of a plurality of positions in response to control signals;
  fluid-operated power booster means having an output member capable of linear motion;
  servo valve means for connecting the power booster means to a source of pressure fluid to cause the output member of the power booster means to be moved, said servo valve means being capable of occupying a first position whereby said output member is moved in one direction, a second position whereby said output member is moved in an opposite direction and an intermediate third position whereby said output member is maintained motionless;
  additional valve means operating in parallel with the servo valve means for additionally connecting the power booster means to the source of pressure fluid;
  first linkage means operated from the output member of the linear positioning means for operating the servo valve means to any one of its operative positions;
  second linkage means also operated from the output member of the linear positioning means for operating the additional valve means;
  cut off means responsive to the amount of displacement of the servo valve means to progressively permit the additional valve means to become operative beyond a first predetermined displacement of said servo valve means, the effect of said cut off means remaining constant beyond a second predetermined displacement of said servo valve means; and
  mechanical feedback means from the output member of the power booster means for causing the servo valve means to return to its intermediate third position as soon as said output member reaches a position analogous to the position occupied by the output member of the linear positioning means.

12. The servo actuator of claim 11 further including time delay means for progressively rendering the cut off means inoperative after a predetermined time.

13. A servo actuator comprising in combination:
  positioning means having an output member positionable to any one of a plurality of positions in response to control signals;

fluid-operated power booster means having a movable output member;

servo valve means for connecting the power booster means to a source of pressure fluid to cause the output member of the power booster means to be moved, said servo valve means being capable of occupying a first position whereby said output member is moved in one direction, a second position whereby said output member is moved in an opposite direction and an intermediate third position whereby said output member is maintained motionless;

additional valve means operating in parallel with the servo valve means for additionally connecting the power booster means to the source of pressure fluid;

first linkage means operated from the output member of the positioning means for operating the servo valve means to any one of its operative positions;

second linkage means also operated from the output member of the positioning means for operating the additional valve means;

cut off means responsive to the amount of displacement of the servo valve means to progressively permit the additional valve means to become operative beyond a first predetermined displacement thereof, the effect of said cut off means remaining constant beyond a second predetermined displacement of said servo valve means; and mechanical feedback means from the output member of the power booster means for causing the servo valve means to return to its intermedaite third position as soon as said output member reaches a position analogous to the position occupied by the output member of the linear positioning means.

14. The servo actuator of claim 13 further including time delay means for progressively rendering the cut off means inoperative after a predetermined time.

15. A servo actuator comprising in combination:

a positioner having an output member linearly positionable to any one of a plurality of positions;

a power booster having an output member linearly movable by fluid introduced to and exhausted from said power booster;

servo valve means for introducing and exhausting fluid from the power booster;

control means between the positioner output member and the servo valve means for operating said servo valve means;

compensating adaptive means responsive to the amplitude of displacement of the positioner output member for augmenting the flow of fluid to and from the power booster proportionally to said amplitude, said compensating adaptive means being inoperative below a predetermined amplitude of the positioner output member and fully operative above another predetermined amplitude of said output member;

feedback means from the power booster output member for progressively closing the servo valve means when the power booster output member has reached a position analogous to the position of the positioner output member; and time delay means progressively cutting off the compensating adaptive means after a predetermined time.

16. A servo actuator comprising in combination:

a positioner having an output member positionable to any one of a plurality of positions;

a power booster having an output member movable by fluid introduced to and exhausted from said power booster;

servo valve means for introducing and exhausting fluid from the power booster;

control means between the positioner output member and the servo valve means for operating said servo valve means;

compensating adaptive means responsive to the amplitude of displacement of the positioner output member for augmenting the flow of fluid to and from the power booster proportionally to said amplitude, said compensating adaptive means being inoperative below a predetermined amplitude of the positioner output member and fully operative above another predetermined amplitude of said output member;

feedback means from the power booster output member for progressively closing the servo valve means when the power booster output member has reached a position analogous to the position of the positioner output member; and time delay means progressively cutting off the compensating adaptive means after a predetermined time.

17. A servo actuator comprising in combination:

a positioner having a positionable output member;

a power booster having a movable output member;

control means for controlling the duration and direction of motion of the power booster output member;

mechanical linkage means between the positioner output member and the control for operating said control means;

compensating adaptive means responsive to the amplitude of displacement of the positioner output member for augmenting the motion velocity of the power booster output member proportionally to said amplitude, said compensating adaptive means being inoperative below a predetermined amplitude of the positioner output member and fully operative above another predetermined amplitude of said output member;

feedback means from the power booster output member for progressively cutting off the control means when the power booster output member has reached a position analogous to the position of the positioner output member;

and time delay means progressively cutting off the compensating adaptive means after a predetermined time.

References Cited by the Examiner

UNITED STATES PATENTS 2,241,077  5/41  Thoma _____ 91—384 XR
2,976,848  3/61  Place _____ 91—445 XR FRED E. ENGELTHALER, *Primary Examiner.*